UNITED STATES PATENT OFFICE.

ELSIE L. P. THOMAS, OF PHILADELPHIA, PENNSYLVANIA.

METHOD OF TREATING FRUIT.

1,047,592.  Specification of Letters Patent.  Patented Dec. 17, 1912.

No Drawing.  Application filed August 26, 1911. Serial No. 646,223.

*To all whom it may concern:*

Be it known that I, ELSIE L. P. THOMAS, a citizen of the United States, residing at Philadelphia, in the county of Philadelphia and State of Pennsylvania, have invented new and useful Improvements in Methods of Treating Fruit, of which the following is a specification.

This invention relates to a method of treating fruit and has particular relation to the applying to fruit of an antiseptic or preservative wash which is capable of preventing the action of hurtful fungus growths or decays that so commonly injure and bring about the destruction of various fruits.

It is an object of the invention to chemically treat the exterior of fruit with a preservative or antiseptic material.

It is also an object of the invention to treat the surface of fruit with a chemical preparation which will kill or prevent the action of fungus growths, decays or other hurtful agencies which ordinarily prove destructive to fruit.

It is a further object of the invention to provide a solution formed of certain antiseptic and preservative chemicals whereby injurious growths, decays or foreign agents are destroyed and the susceptibility of the fruit to decay rendered very much less than is usual, the fruit being preferably thus treated before it is packed and shipped.

It is still a further object of the invention to provide a method of treating the skins or exterior surface of citrus fruit which are to be packed and shipped to a distance, the material with which the said fruit is treated being of an antiseptic and preservative character which is not hurtful to the fruit and which would be harmless to the user of the fruit or of the skins although the material penetrated the skin and entered the heart thereof.

The packing and shipping of fruit and particularly of citrus fruit has offered a difficult problem in the accomplishing of such packing and shipping without the decay and destruction of the fruit at too early a period. The fruit, particularly oranges and lemons and all citrus, are of more or less tender skins and are injured frequently in the picking and handling thereof by reason of which decay and the spores of fungus growths and decays enter the fruit or penetrate the skin so that the loss of the fruit is hastened. All of such injuries to the fruit of course hastens decay, since it opens the way for the entrance of fungus growths and decays which could not enter if the skin is preserved in complete and perfect condition. However experience and experiments have shown that such decays and fungus growths can be prevented from affecting the fruit whether injured or uninjured, for a considerable length of time, if the fruit is chemically treated with ingredients that will remove fungus or other growths or prevent their active lodgment in the skins of the fruit or injured spots thereof. The present invention is designed to accomplish this purpose and involves the use of a solution containing antiseptic and preservative ingredients, together with a sufficient amount of oily material to restore the oily condition of the skin after the skins have been cleansed and the foreign deteriorating agents have been removed.

In carrying out the invention, the fruit may or may not be first washed and cleaned. In either case the fruit is immersed in a bath formed of the preservatives used, suitably mixed and compounded and added to a given quantity of water for reducing its strength to the desired degree. The preservative means employed is preferably compounded in accordance with the following formula.

| | |
|---|---|
| Resorcinol | one part. |
| Terpin hydrate | one part. |
| Copper sulfate | two parts. |
| Sodium salicylate | two parts. |
| Sodium benzoate | two parts. |
| Ammonium carbonate | four parts. |

The parts are compounded by placing the finely powdered resorcinol and terpin hydrate, which have been previously mixed together, in a porcelain dish and heating the same to a temperature of 100° C. or 212° F. The material is maintained at this temperature for about ten minutes. The copper sulfate is next powdered, preferably only the clear crystals being used and is thoroughly mixed in proportions named, with the sodium salicylate and sodium benzoate in their full proportions added after which the mixture is added to the melted substance obtained by the heating of the resorcinol and terpin hydrate, all of the ingredients being then mixed thoroughly. Finally the ammonium carbonate which has been powdered and is clear, it not being used in the form of an opaque powder, is added, after which the materials mixed as set forth are covered with a cloth in any suitable receptacle and allowed to stand about one hour. The compound resulting is pressed in cakes and preferably boxed in any suitable air tight containers or receptacles.

In using the material compounded in accordance with this formula for treating fruit, it is usual to take a half ounce of the material of the formula and mix it with one ounce of liquid petrolatum and then add water gradually until a gallon of the solution has been attained. A sufficient quantity of the solution is made up with the petrolatum in the proportions set forth to form a suitable bath for the immersing of the fruit in any desired quantities. The fruit is usually first washed as above intimated and then inserted in the bath proper made in accordance with the above formula, after which it is taken out and dried and is ready for packing and shipment. Experiment has shown me that fruit thus treated is capable of shipment and keeping for a number of weeks without the beginning of decay. Fruit which has also been partially decayed or been injured has had its decay arrested and been preserved in the condition in which it was when treated for an indefinite period.

It will be understood that I contemplate employing other antiseptic and germ or fungus killing materials in place of those recited in the formula within the spirit of the invention, it being the purpose of the materials applied to prevent the lodgment of the spores of fungus or other injurious growths which have been found to injure fruit and cause their decay or to arrest the action of any that have already become lodged in the skins or imperfections thereof and remove the same entirely from the fruit.

What I claim is:—

1. The method of preserving citrus fruit without altering the exterior appearance thereof, comprising the subjecting of the skins to a bath of a fungicide and antiseptic material, having an oily ingredient combined therewith for preserving the original oily condition of the fruit when picked.

2. The method of preserving fruit, comprising the treating of the same with a solution containing about one part of resorcinol, one part of terpin hydrate, two parts of copper sulfate, two parts of sodium salicylate, two parts of sodium benzoate, four parts of ammonium carbonate and an ounce of liquid petrolatum, compounded and mixed together.

3. The method of preserving fruit comprising the formation of a compound containing one part of resorcinol, one part of terpin hydrate, two parts of copper sulfate, two parts of sodium salicylate, two parts sodium benzoate, four parts of ammonium carbonate mixed as above described and allowed to stand after which a solution is formed by taking a portion of said compound and a small quantity of petrolatum, and water to properly carry the same and immersing the fruit therein after which the fruit is dried.

In witness that I claim the foregoing I have hereunto subscribed my name this 17th day of August, 1911.

ELSIE L. P. THOMAS.

Witnesses:
 CASSELL SEVERANCE,
 EARLE R. POLLARD.